(12) United States Patent
Hajima

(10) Patent No.: US 11,543,539 B2
(45) Date of Patent: Jan. 3, 2023

(54) AIRCRAFT FLIGHT CONTROL APPARATUS, AIRCRAFT FLIGHT CONTROLLING METHOD, AND NON-TRANSITORY STORAGE MEDIUM

(71) Applicant: SUBARU CORPORATION, Tokyo (JP)

(72) Inventor: Toshiyuki Hajima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 276 days.

(21) Appl. No.: 16/505,178

(22) Filed: Jul. 8, 2019

(65) Prior Publication Data

US 2020/0096645 A1 Mar. 26, 2020

(30) Foreign Application Priority Data

Sep. 21, 2018 (JP) .............................. JP2018-176878

(51) Int. Cl.
 *G01S 19/21* (2010.01)
 *G01C 21/20* (2006.01)
 *B64C 39/02* (2006.01)
(52) U.S. Cl.
 CPC .......... *G01S 19/215* (2013.01); *B64C 39/024* (2013.01); *G01C 21/20* (2013.01); *B64C 2201/145* (2013.01)
(58) Field of Classification Search
 CPC ................. G01S 19/215; B64C 39/024; B64C 2201/145
 See application file for complete search history.

(56) References Cited

U.S. PATENT DOCUMENTS

| 6,779,752 B1 | 8/2004 | Ratkovic |
| 9,689,686 B1 | 6/2017 | Carmack et al. |
| 9,725,171 B1 | 8/2017 | Carmack et al. |
| 9,847,033 B1 | 12/2017 | Carmack et al. |

(Continued)

FOREIGN PATENT DOCUMENTS

| CN | 107861135 A | 3/2018 |
| JP | 2001-143200 A | 5/2001 |

(Continued)

OTHER PUBLICATIONS

M.L. Psiaki et al., "GNSS Spoofing and Detection", Proceedings of the IEEE, Apr. 1, 2016, vol. 104, No. 6, p. 1258-1270.

(Continued)

*Primary Examiner* — Peter D Nolan
*Assistant Examiner* — Roy Rhee
(74) *Attorney, Agent, or Firm* — McDermott Will & Emery LLP

(57) ABSTRACT

An aircraft flight control apparatus includes a flight track acquiring unit and a determining unit. The flight track acquiring unit is configured to measure a position of an aircraft to acquire a flight track of the aircraft. The determining unit is configured to determine, when an own-aircraft deviation amount gradually increases, whether the aircraft receives a spoofed signal as a satellite positioning system signal, on the basis of the own-aircraft deviation amount. The own-aircraft deviation amount is an amount of deviation of the flight track acquired by the flight track acquiring unit from a scheduled flight route of the aircraft.

5 Claims, 2 Drawing Sheets

(56) References Cited

U.S. PATENT DOCUMENTS

| | | | |
|---|---|---|---|
| 9,849,978 B1 | | 12/2017 | Carmack et al. |
| 10,466,700 B1 | * | 11/2019 | Carmack ................ H04K 3/224 |
| 2010/0174426 A1 | * | 7/2010 | Turung ................ G05D 1/0061 |
| | | | 701/11 |
| 2011/0227787 A1 | | 9/2011 | Gum et al. |
| 2013/0328719 A1 | | 12/2013 | Gum et al. |
| 2014/0343765 A1 | | 11/2014 | Suiter et al. |
| 2015/0192926 A1 | | 7/2015 | Kozlow et al. |
| 2015/0192927 A1 | | 7/2015 | Kozlow et al. |
| 2015/0234053 A1 | | 8/2015 | Psiaki et al. |
| 2016/0318622 A1 | | 11/2016 | Haukom |
| 2017/0227650 A1 | | 8/2017 | Grobert |
| 2018/0047225 A1 | | 2/2018 | Batcheller et al. |
| 2020/0122830 A1 | * | 4/2020 | Anderson ............. B64C 39/024 |

FOREIGN PATENT DOCUMENTS

| | | |
|---|---|---|
| JP | 2001-280997 A | 10/2001 |
| JP | 2001-283400 A | 10/2001 |
| JP | 2004-212238 A | 7/2004 |
| JP | 2006-514258 A | 4/2006 |
| JP | 2013-529289 A | 7/2013 |
| JP | 2014-214927 A | 11/2014 |
| WO | 2015/033138 A1 | 3/2015 |
| WO | 2016/003262 A1 | 1/2016 |

OTHER PUBLICATIONS

Japanese Notice of Reasons for Refusal issued in corresponding Japanese Patent Application No. 2018-176878, dated Mar. 17, 2020, with English translation.

* cited by examiner

AIRCRAFT FLIGHT CONTROL APPARATUS, AIRCRAFT FLIGHT CONTROLLING METHOD, AND NON-TRANSITORY STORAGE MEDIUM

CROSS-REFERENCE TO RELATED APPLICATIONS

The present application claims priority from Japanese Patent Application No. 2018-176878 filed on Sep. 21, 2018, the entire contents of which are hereby incorporated by reference.

BACKGROUND

The technology relates to a technique that favorably detects satellite positioning system spoofing causing a satellite positioning system device of an aircraft to receive a spoofed signal.

Recently, operation of an unmanned aircraft (unmanned aerial vehicle (UAV)) often involves measurement of an own aircraft position utilizing the GPS. For example, reference is made to Japanese Unexamined Patent Application Publication No. 2001-283400.

SUMMARY

An aspect of the technology provides an aircraft flight control apparatus that includes a flight track acquiring unit, and a determining unit. The flight track acquiring unit is configured to measure a position of an aircraft to acquire a flight track of the aircraft. The determining unit is configured to determine, when an own-aircraft deviation amount gradually increases, whether the aircraft receives a spoofed signal as a satellite positioning system signal, on the basis of the own-aircraft deviation amount. The own-aircraft deviation amount is an amount of deviation of the flight track acquired by the flight track acquiring unit from a scheduled flight route of the aircraft.

An aspect of the technology provides an aircraft flight controlling method including: measuring a position of an aircraft; acquiring a flight track of the aircraft on the basis of the measured position of the aircraft; and determining, when an own-aircraft deviation amount gradually increases, whether the aircraft receives a spoofed signal as a satellite positioning system signal, on the basis of the own-aircraft deviation amount, the own-aircraft deviation amount being an amount of deviation of the acquired flight track from a scheduled flight route of the aircraft.

An aspect of the technology provides a non-transitory storage medium that includes an aircraft flight control program embodied therein. The aircraft flight control program causes, when executed by an information processor, the information processor to implement a method. The method includes: measuring a position of an aircraft; acquiring a flight track of the aircraft on the basis of the measured position of the aircraft; and determining, when an own-aircraft deviation amount gradually increases, whether the aircraft receives a spoofed signal as a satellite positioning system signal, on the basis of the own-aircraft deviation amount, the own-aircraft deviation amount being an amount of deviation of the acquired flight track from a scheduled flight route of the aircraft.

An aspect of the technology provides an aircraft flight control apparatus that includes circuitry. The circuitry is configured to measure a position of an aircraft to acquire a flight track of the aircraft. The circuitry is configured to determine, when an own-aircraft deviation amount gradually increases, whether the aircraft receives a spoofed signal as a satellite positioning system signal, on the basis of the own-aircraft deviation amount. The own-aircraft deviation amount is an amount of deviation of the acquired flight track from a scheduled flight route of the aircraft.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
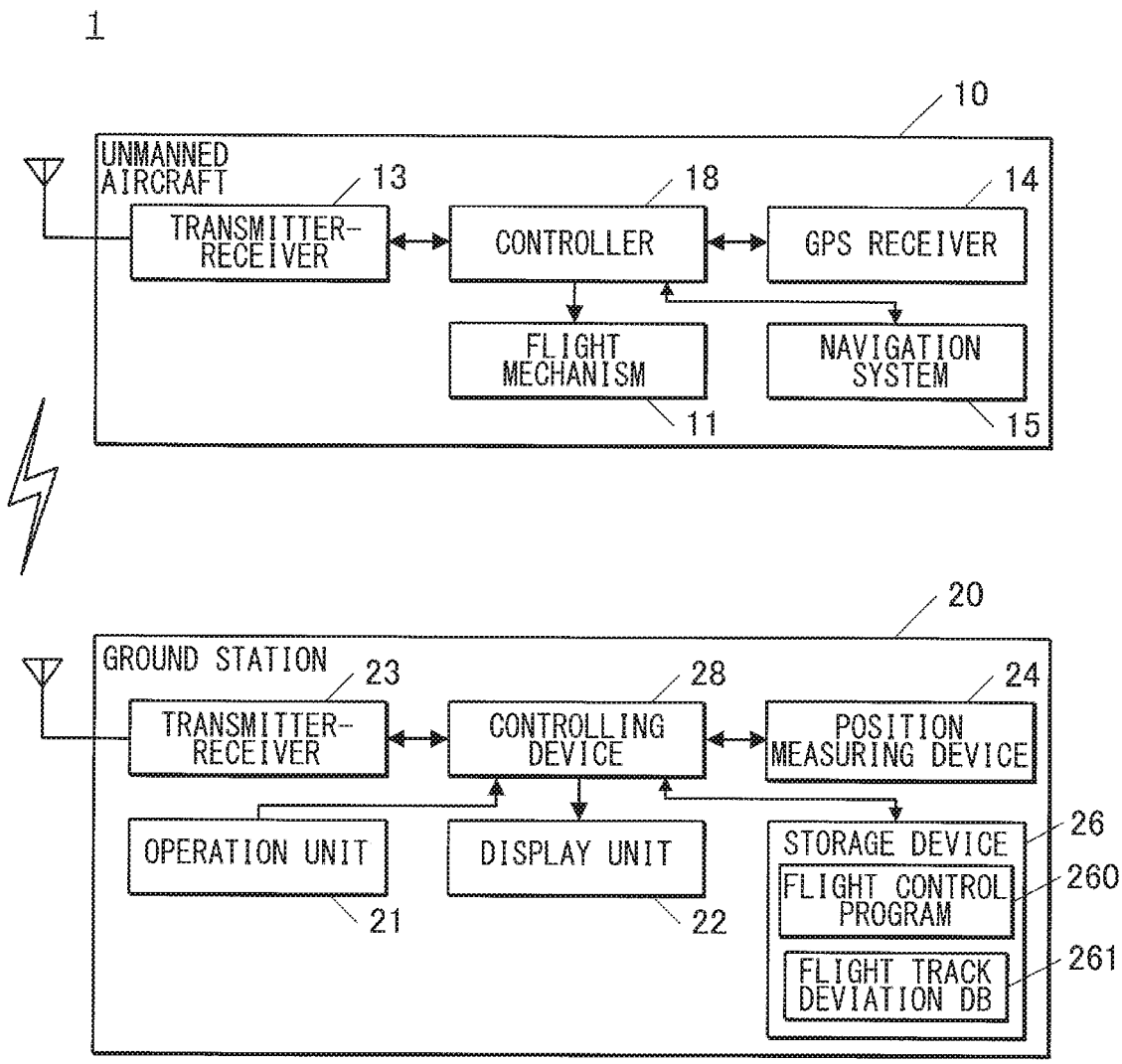
FIG. 1 is a block diagram illustrating an example of an outline configuration of a control system of an unmanned aircraft according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

In a case where a GPS device of the unmanned aircraft is made to undergo spoofing using a false GPS signal, i.e., a spoofed signal, it may be difficult for the unmanned aircraft to acquire an accurate own aircraft position. For example, in a case where a flight track of the unmanned aircraft gradually deviates from a scheduled flight route due to the spoofed signal, it may be difficult to detect that the unmanned aircraft is receiving the spoofed signal. This can cause a delay in dealing with the spoofing.

It is desirable to provide an aircraft flight control apparatus, an aircraft flight controlling method, and a non-transitory storage medium including an aircraft flight control program that favorably detect satellite positioning system spoofing causing a satellite positioning system device of an aircraft to receive a spoofed signal.

Configuration

A description is given first of a configuration of an unmanned aircraft control system 1 according to an example embodiment of the technology. Hereinafter, the unmanned aircraft control system 1 is simply referred to as the "control system 1".

FIG. 1 illustrates an outline configuration of the control system 1.

Referring to FIG. 1, the control system 1 may include an unmanned aircraft (UAV) 10 and a ground station 20. The ground station 20 may monitor and control behavior of the unmanned aircraft 10.

It is to be noted that although the example embodiment described below refers to a case where the control system 1 includes the unmanned aircraft 10, one embodiment of the technology is not limited thereto. In one example embodiment, the aircraft may be a manned aircraft.

The unmanned aircraft 10 may include a flight mechanism 11, a transmitter-receiver 13, a GPS receiver 14, a navigation system 15, and a controller 18, for example. The flight mechanism 11 may cause the unmanned aircraft 10 to fly.

The transmitter-receiver 13 may construct a datalink between the transmitter-receiver 13 and a transmitter-receiver 23 of the ground station 20. The transmitter-receiver 13 may be able to transmit and receive various signals.

The GPS receiver 14 may receive, from a GPS satellite, a GPS signal including information of an own aircraft position of the unmanned aircraft 10, i.e., a current position of the unmanned aircraft 10. The GPS receiver 14 may supply the controller 18 with information such as a reception state of the GPS signal or the own aircraft position of the unmanned aircraft 10 acquired on the basis of the GPS signal.

It is to be noted that, in one example embodiment, any satellite positioning system other than the GPS may be used. Non-limiting examples of the satellite positioning system may include global navigation satellite system (GLONASS), Galileo positioning system, and BeiDou navigation satellite system (BDS). In this case, the GPS receiver 14 may be replaced by a device corresponding to the adopted satellite positioning system.

The navigation system 15 may be able to measure, for example but not limited to, the position of the unmanned aircraft 10 and a speed of the unmanned aircraft 10 by a device such as a sensor mounted on the unmanned aircraft 10 without depending on any electromagnetic wave provided from outside. The navigation system 15 may supply the controller 18 with information related to the measured own aircraft position of the unmanned aircraft 10. The navigation system 15 may correct a navigation position on the basis of the own aircraft position acquired from the GPS signal and reduce accumulation of errors to supply the controller 18 with the corrected navigation position.

The controller 18 may perform central control of each unit of the unmanned aircraft 10. For example, the controller 18 may drive the flight mechanism 11 to control the flight of the unmanned aircraft 10. For example, the controller 18 may control operation of a device such as the transmitter-receiver 13 or the GPS receiver 14.

The ground station 20 may include an operation unit 21, a display unit 22, the transmitter-receiver 23, a position measuring device 24, a storage device 26, and a controlling device 28, for example. An unmanned aircraft flight control apparatus according to one example embodiment of the technology may include at least the position measuring device 24, the storage device 26, and the controlling device 28.

The operation unit 21 may include a device that receives an operation input performed by an operator. The device may be, for example but not limited to, a keyboard. The operation unit 21 may supply the controlling device 28 with a signal corresponding to an operation state of the device such as the keyboard.

The display unit 22 may include a display, and display various pieces of information on the display.

The transmitter-receiver 23 may construct the datalink between the transmitter-receiver 23 and the transmitter-receiver 13 of the unmanned aircraft 10. The transmitter-receiver 23 may be able to transmit and receive various signals.

The position measuring device 24 may directly measure the position of the unmanned aircraft 10 without depending on the GPS or any other satellite positioning system. The position measuring device 24 may be, for example but not limited to, a radar device.

The storage device 26 may be a memory that holds, for example but not limited to, various programs and various pieces of data. The storage device 26 may also serve as a workspace. In the example embodiment, the storage device 26 may hold a flight control program 260.

The flight control program 260 may be directed to execution, by the controlling device 28, of a flight control process which will be described later.

The storage device 26 may include a flight track deviation amount database (DB) 261.

The flight track deviation amount DB 261 may hold in advance types and degrees of respective two or more aircraft damages and damage deviation amounts in association. The damage deviation amounts may each be an amount of deviation, from a normal scheduled flight route, resulting from the corresponding aircraft damage. As used herein, the term "aircraft damage" encompasses various damage states of the unmanned aircraft 10 that can cause deviation in flight track. Non-limiting examples of the damage state of the unmanned aircraft 10 may include a malfunction of the navigation system 15.

The controlling device 28 may perform central control of each unit of the control system 1. For example, the controlling device 28 may perform transmission and reception of various pieces of information between the ground station 20 and the unmanned aircraft 10 via the transmitter-receiver 23 on the basis of a signal supplied from the operation unit 21. For example, the controlling device 28 may expand any of the programs stored in the storage device 26 and execute various processes in cooperation with the expanded program.

Operation

A description is given next of operation of the control system 1 at a time of performing flight control of the unmanned aircraft 10.

Figure 2:
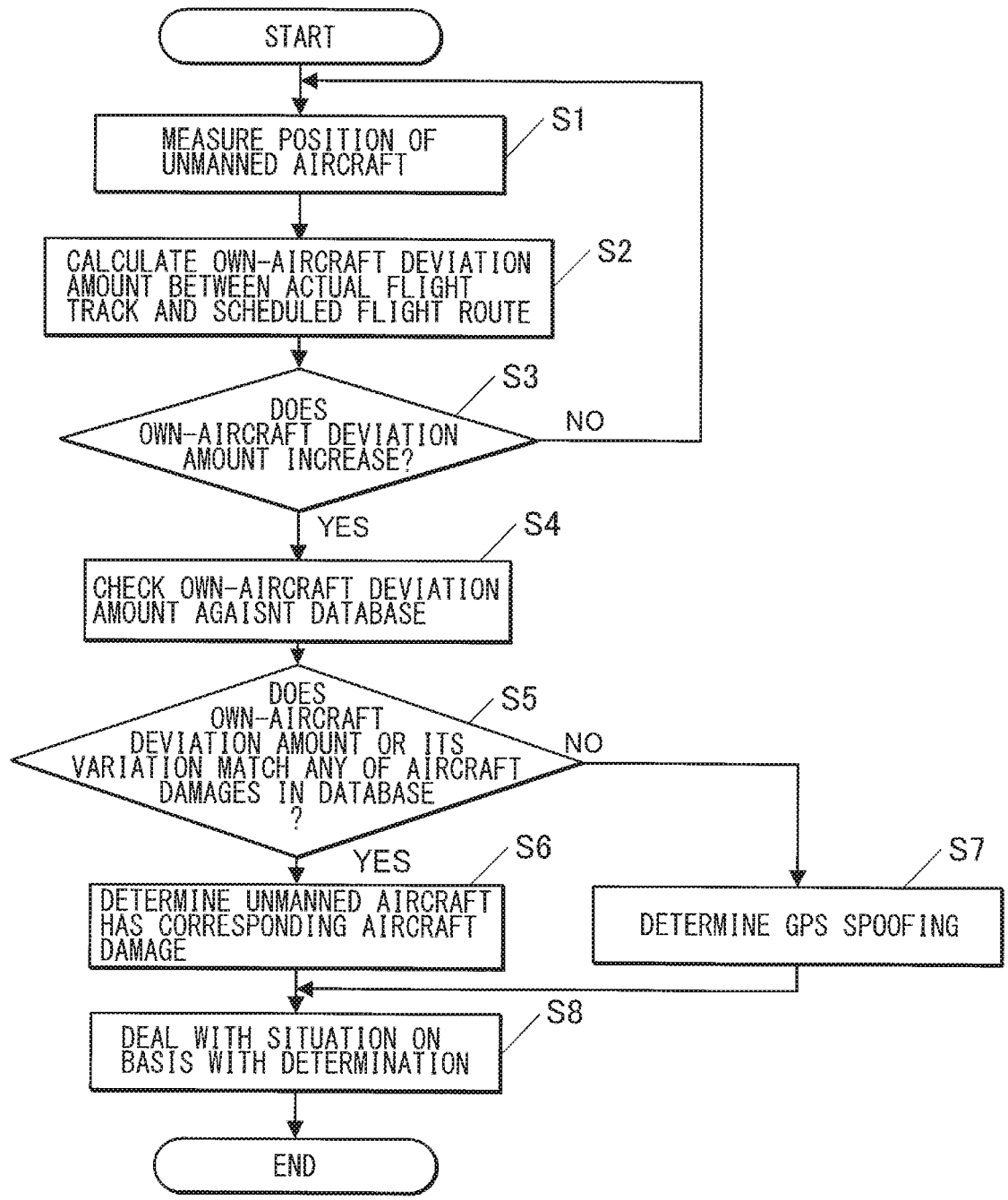
FIG. 2 is a flowchart illustrating an example of a flow of a flight control process according to one example embodiment.

FIG. 2 illustrates a flow of the flight control process according to the example embodiment.

The flight control process according to the example embodiment may determine, in a case where the flight of the unmanned aircraft 10 deviates from a scheduled flight route, which of a damage in the unmanned aircraft 10 and GPS spoofing causes the deviation. The GPS spoofing refers to that a spoofed signal, i.e., a false signal, is transmitted as a GPS signal. The flight control process may be executed by reading the flight control program 260 from the storage device 26 by the controlling device 28 and expanding the flight control program 260 by the controlling device 28.

In the description below, an example embodiment is described in which the unmanned aircraft 10 is so flying that the unmanned aircraft 10 is to fly along a predetermined scheduled flight route.

As illustrated in FIG. 2, when the flight control process is executed, the controlling device 28 may first measure the position of the unmanned aircraft 10 by the position measuring device 24 (step S1).

Thereafter, the controlling device 28 may compare an actual flight track of the unmanned aircraft 10 with the scheduled flight route and calculate an own-aircraft deviation amount, i.e., an amount of deviation of the actual flight track of the unmanned aircraft 10 from the scheduled flight route (step S2).

For example, the controlling device 28 may calculate the flight track of the unmanned aircraft 10 on the basis of the position of the unmanned aircraft 10 measured in step S1. Further, the controlling device 28 may compare the calculated flight track of the unmanned aircraft 10 with the scheduled flight route stored in advance in the storage device 26 to calculate the own-aircraft deviation amount.

Thereafter, the controlling device 28 may determine whether the own-aircraft deviation amount calculated in step S2 gradually increases (step S3). In a case where the controlling device 28 determines that the own-aircraft deviation amount does not gradually increase (NO in step S3), the controlling device 28 may return to the process in step S1 described above.

In a case where the controlling device 28 determines in step S3 that the own-aircraft deviation amount gradually increases (YES in step S3), the controlling device 28 may check the own-aircraft deviation amount against the flight track deviation amount DB 261 (step S4). In other words, the controlling device 28 may determine whether the calculated own-aircraft deviation amount or variation in the calculated own-aircraft deviation amount matches any of the aircraft damages in the flight track deviation amount DB 261 (step S5). For example, the controlling device 28 may determine whether the calculated own-aircraft deviation amount or variation in the calculated own-aircraft deviation amount matches the damage deviation amount or its variation of any of the aircraft damages in the flight track deviation amount DB 261.

In a case where the aircraft damage corresponding to the own-aircraft deviation amount or the variation in the own-aircraft deviation amount is found in the flight track deviation amount DB 261 as a result of the checking described above (YES in step S5), the controlling device 28 may determine that the unmanned aircraft 10 has the corresponding aircraft damage (step S6).

In contrast, in a case where the aircraft damage corresponding to the own-aircraft deviation amount or the variation in the own-aircraft deviation amount is not found in the flight track deviation amount DB 261 (NO in step S5), the controlling device 28 may determine that the unmanned aircraft 10 undergoes the GPS spoofing (step S7). In other words, the controlling device 28 may determine that the gradual increase in own-aircraft deviation amount of the flight track is resulting from acquisition of false position information due to the spoofed signal while the unmanned aircraft 10 does not have an issue such as an aircraft damage.

Thereafter, the controlling device 28 may deal with the situation on the basis with the determination made in step S6 or S7 (step S8). In one example, the controlling device 28 may cause the unmanned aircraft 10 to fly without using the GPS. In another example, the controlling device 28 may cause the unmanned aircraft 10 to stop flying. Thereafter, the controlling device 28 may end the flight control process.

Example Effects

As described above, according to the example embodiment, whether the unmanned aircraft 10 receives a spoofed signal as the GPS signal is determined on the basis of the own-aircraft deviation amount when the own-aircraft deviation amount gradually increases. The own-aircraft deviation amount is an amount of deviation of the flight track of the unmanned aircraft 10 from the scheduled flight route of the unmanned aircraft 10.

Hence, it is possible to favorably detect the GPS spoofing that causes the GPS receiver 14 of the unmanned aircraft 10 to receive the spoofed signal.

Further, the own-aircraft deviation amount of the flight track of the unmanned aircraft 10 from the scheduled flight route may be checked against the flight track deviation amount DB 261. The flight track deviation amount DB 261 may hold in advance the two or more types of aircraft damages and the damage deviation amounts in association. The damage deviation amounts may each be the deviation amount of the flight track from the scheduled flight route when the unmanned aircraft 10 has the corresponding aircraft damage. In a case where the aircraft damage corresponding to the own-aircraft deviation amount is not found in the flight track deviation amount DB 261, it may be determined that the unmanned aircraft 10 receives the spoofed signal as the GPS signal.

Hence, it is possible to favorably detect the GPS spoofing made on the unmanned aircraft 10.

Modification Examples

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the example embodiment described above, the calculated own-aircraft deviation amount of the flight track may be checked against the flight track deviation amount DB 261 to detect the GPS spoofing; however, this is non-limiting.

In one example embodiment, when the own-aircraft deviation amount of the flight track gradually increases, the controlling device 28 may cause artificial intelligence to calculate, on the basis of the own-aircraft deviation amount, a feature that quantifies a difference, between the aircraft damages, in how the flight track deviates from the scheduled flight route. Further, the controlling device 28 may determine, on the basis of the calculated feature, whether the unmanned aircraft 10 receives the spoofed signal. This technique also makes it possible to favorably detect the GPS spoofing made on the unmanned aircraft 10.

In the example embodiment described above, the GPS may be used. However, this is non-limiting. In one example embodiment, any satellite positioning system other than the GPS may be used. Non-limiting examples of the satellite positioning system may include global navigation satellite system (GLONASS), Galileo positioning system, and BeiDou navigation satellite system (BDS).

Each of the controller 18, the position measuring device 24, and the controlling device 28 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the controller 18, the position measuring device 24, and the controlling device 28 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the controller 18, the position measuring device 24, and the controlling device 28 illustrated in FIG. 1.

The invention claimed is:

1. An aircraft flight controlling method to be performed by an aircraft flight control apparatus being located away from an aircraft, the aircraft including a navigation unit installed thereon, the navigation unit including a sensor that measures a position of the aircraft and being configured to provide the aircraft with a navigation position that is the measured position, the measured position being corrected based on a position obtained from a GPS signal, the aircraft being configured to fly along a scheduled flight route using the navigation position provided from the navigation unit, the aircraft flight controlling method comprising:
   measuring a position of the aircraft to acquire a flight track of the aircraft;
   when detecting that a deviation amount of the acquired flight track from the scheduled flight route of the aircraft gradually increases, determining whether the GPS signal used to measure the position of the aircraft is a spoofed signal based on data in a database, wherein the data in the database includes i) first data indicating types of damages of the navigation unit and ii) second data indicating deviation amounts and variation in the deviation amounts associated with the types of damages of the navigation unit in the first data;
   when detecting that the deviation amount increases to a first deviation amount, checking whether the first deviation amount matches one of the deviation amounts in the second data associated with the types of damages of the navigation unit in the first data;
   determining that the aircraft receives the spoofed signal as the GPS signal when the first deviation amount does not match any one of the deviation amounts in the second data associated with the types of damages of the navigation unit in the first data; and
   controlling, in response to determining that the GPS signal is the spoofed signal, the aircraft to fly without using the GPS signal,
   wherein, when detecting that the deviation amount increases to the first deviation amount, the database is checked to determine that the database includes a data set of which the second data indicates a variation to the first deviation amount, and
   wherein the navigation unit is determined to be damaged when the database includes the data set of which the second data indicates the variation to the first deviation amount.

2. An aircraft flight control apparatus for controlling an aircraft, the aircraft flight control apparatus being located away from the aircraft, the aircraft including a navigation unit installed thereon, the navigation unit including a sensor that measures a position of the aircraft and being configured to provide the aircraft with a navigation position that is the measured position, the navigation position being corrected based on a position obtained from a GPS signal, the aircraft being configured to fly along a scheduled flight route using the navigation position provided from the navigation unit, the aircraft flight control apparatus comprising:
   a radar configured to measure a position of the aircraft to acquire a flight track of the aircraft;
   a determining unit configured to determine, when detecting that a deviation amount of the flight track measured by the radar from the scheduled flight route of the aircraft gradually increases, whether the aircraft receives a spoofed signal as the GPS signal; and
   a storage unit including a database comprising:
      first data indicating types of damages of the navigation unit; and
      second data indicating deviation amounts and variation in the deviation amounts associated with the types of damages of the navigation unit in the first data,
   wherein the determining unit is configured to:
      when detecting that the deviation amount increases to a first deviation amount, check whether the first deviation amount matches one of the deviation amounts in the second data associated with the types of damages of the navigation unit in the first data; and
      determine that the aircraft receives the spoofed signal as the GPS signal when the first deviation amount does not match any one of the deviation amounts in the second data associated with the types of damages of the navigation unit in the first data,
   wherein the aircraft flight control apparatus further includes a controlling device configured to, in response to the determining unit determining that the GPS signal is the spoofed signal, control the aircraft to fly without using the GPS signal, and
   wherein the determining unit is configured to:
      when detecting that the deviation amount increases to the first deviation amount, check whether the database includes a data set of which the second data indicates a variation to the first deviation amount; and
      determine that the navigation unit is damaged when the database includes the data set of which the second data indicates the variation to the first deviation amount.

3. The aircraft flight control apparatus according to claim 2, wherein the aircraft comprises an unmanned aircraft.

4. The aircraft flight control apparatus according to claim 3, wherein the GPS signal comprises a global positioning system signal.

5. The aircraft flight control apparatus according to claim 2, wherein the GPS signal comprises a global positioning system signal.

* * * * *